United States Patent
Greim

(10) Patent No.: US 8,488,193 B2
(45) Date of Patent: Jul. 16, 2013

(54) METHOD FOR STORING AND READING DATA

(75) Inventor: Paul Greim, Neusaess (DE)

(73) Assignee: Crossmedia Solution GmbH & Co. KG, Egling (DE)

( * ) Notice: Subject to any disclaimer, the term of this patent is extended or adjusted under 35 U.S.C. 154(b) by 310 days.

(21) Appl. No.: 12/933,412

(22) PCT Filed: Mar. 16, 2009

(86) PCT No.: PCT/EP2009/075013
§ 371 (c)(1), (2), (4) Date: Sep. 28, 2010

(87) PCT Pub. No.: WO2009/121356
PCT Pub. Date: Oct. 8, 2009

(65) Prior Publication Data
US 2011/0063642 A1    Mar. 17, 2011

(30) Foreign Application Priority Data

Apr. 2, 2008 (DE) .......................... 10 2008 017 168

(51) Int. Cl.
*G06K 9/00* (2006.01)
(52) U.S. Cl.
USPC ............................. 358/1.9; 382/100; 235/454
(58) Field of Classification Search
None
See application file for complete search history.

(56) References Cited

U.S. PATENT DOCUMENTS

| | | | | |
|---|---|---|---|---|
| 5,710,420 A | * | 1/1998 | Martin et al. | 235/487 |
| 5,862,255 A | * | 1/1999 | Davies et al. | 382/183 |
| 5,864,127 A | * | 1/1999 | Jackson et al. | 235/454 |
| 6,427,920 B1 | * | 8/2002 | Bloomberg et al. | 235/494 |
| 6,708,894 B2 | * | 3/2004 | Mazaika | 235/494 |
| 6,993,655 B1 | * | 1/2006 | Hecht et al. | 713/176 |
| 7,280,254 B2 | * | 10/2007 | Chen | 358/3.26 |
| 7,328,851 B1 | * | 2/2008 | Iftime et al. | 235/494 |
| 7,387,261 B2 | * | 6/2008 | Onishi | 235/494 |
| 7,422,154 B2 | * | 9/2008 | Ericson | 235/462.11 |
| 7,426,284 B2 | * | 9/2008 | Ishii | 382/100 |
| 7,433,075 B2 | * | 10/2008 | Tokunaga et al. | 358/1.9 |

(Continued)

FOREIGN PATENT DOCUMENTS

EP    1876552 A1 *    1/2008

*Primary Examiner* — King Poon
*Assistant Examiner* — Ted Barnes
(74) *Attorney, Agent, or Firm* — Andrew Wilford

(57) ABSTRACT

A method for storing data is described, wherein the data to be stored is printed in the form of a dot pattern comprising a plurality of dots onto the surface of an imprintable medium using a printing device, wherein the dot pattern comprises at least one dot pattern block covering a defined area on the imprintable medium, and wherein the area, which is covered by the at least one dot pattern block on the medium to be imprinted, comprises a plurality of partial surfaces of equal size disposed next to and/or on top of each other, a dot pattern each representing a portion of the data to be stored being printed in said partial area. The method described is characterized in that each partial area comprises one of several different base dot patterns, or a reference dot pattern, that each of the several base dot patterns includes of two dots, which with respect to a virtual reference point are disposed in a point-symmetrical manner inside the respective partial area, and that the base dot patterns differ with respect to the angle of the virtual connecting line between the two dots of the respective base dot pattern with respect to a virtual reference line. The invention further relates to a method for reading the data stored in this manner.

18 Claims, 3 Drawing Sheets

U.S. PATENT DOCUMENTS

| | | | |
|---|---|---|---|
| 7,475,824 B2 * | 1/2009 | Yoshida | 235/494 |
| 7,528,970 B2 * | 5/2009 | Nomura et al. | 358/1.12 |
| 7,649,637 B2 * | 1/2010 | Wiebe et al. | 358/1.11 |
| 7,660,020 B2 * | 2/2010 | Ishii | 358/3.28 |
| 7,668,336 B2 * | 2/2010 | Ishii | 382/100 |
| 7,706,026 B2 * | 4/2010 | Ishii | 358/3.28 |
| 7,715,055 B2 * | 5/2010 | Abe et al. | 358/3.28 |
| 7,751,089 B2 * | 7/2010 | Fahraeus et al. | 358/3.28 |
| 7,753,283 B2 * | 7/2010 | Lynggaard | 235/494 |
| 7,813,008 B2 * | 10/2010 | Chen | 358/3.26 |
| 7,880,922 B2 * | 2/2011 | Onishi | 358/1.2 |
| 7,898,697 B2 * | 3/2011 | Tanaka | 358/3.28 |
| 8,009,305 B2 * | 8/2011 | Ishikawa et al. | 358/1.14 |
| 8,009,860 B2 * | 8/2011 | Ishii | 382/100 |
| 8,014,559 B2 * | 9/2011 | Ishii | 382/100 |
| 8,031,375 B2 * | 10/2011 | Yoshida | 358/3.28 |
| 8,054,495 B2 * | 11/2011 | Goldstein et al. | 358/1.18 |
| 8,054,508 B2 * | 11/2011 | Ishii | 358/3.28 |
| 8,054,512 B2 * | 11/2011 | Saund | 358/473 |
| 8,107,092 B2 * | 1/2012 | Wiebe et al. | 358/1.11 |
| 8,130,391 B2 * | 3/2012 | Gonzalez et al. | 358/1.15 |
| 8,171,082 B2 * | 5/2012 | Mitsutake | 709/205 |
| 8,189,923 B2 * | 5/2012 | Yoshida | 382/190 |
| 8,228,564 B2 * | 7/2012 | Hara | 358/3.28 |
| 8,237,954 B2 * | 8/2012 | Kubo | 358/1.15 |
| 8,237,983 B2 * | 8/2012 | Yoshida | 358/1.8 |
| 8,253,982 B2 * | 8/2012 | Yoshida | 358/3.28 |
| 8,274,698 B2 * | 9/2012 | Yasunaga | 358/1.9 |
| 8,368,954 B2 * | 2/2013 | Yoshida | 358/1.9 |
| 2004/0051885 A1 * | 3/2004 | Matsunoshita | 358/1.9 |
| 2005/0173544 A1 * | 8/2005 | Yoshida | 235/494 |
| 2006/0221383 A1 * | 10/2006 | Katsurabayashi | 358/1.15 |
| 2006/0244985 A1 * | 11/2006 | Fahraeus et al. | 358/1.12 |
| 2007/0041051 A1 * | 2/2007 | Tanaka | 358/1.18 |
| 2007/0199990 A1 * | 8/2007 | Sonoda | 235/454 |
| 2007/0217651 A1 * | 9/2007 | Ishii | 382/100 |
| 2008/0110995 A1 * | 5/2008 | Iftime et al. | 235/491 |
| 2008/0192295 A1 * | 8/2008 | Gonzalez et al. | 358/1.16 |
| 2008/0219736 A1 * | 9/2008 | Lynggaard | 400/76 |
| 2008/0297489 A1 * | 12/2008 | Funo et al. | 345/175 |
| 2009/0063932 A1 * | 3/2009 | Ishii | 714/758 |
| 2009/0066977 A1 * | 3/2009 | Yoshida | 358/1.8 |
| 2009/0091530 A1 * | 4/2009 | Yoshida | 345/156 |
| 2009/0103137 A1 * | 4/2009 | Ishii | 358/1.17 |
| 2010/0133351 A1 * | 6/2010 | Yoshida | 235/494 |
| 2010/0276887 A1 * | 11/2010 | Yoshida | 273/293 |
| 2010/0302171 A1 * | 12/2010 | Yoshida | 345/173 |
| 2012/0325910 A1 * | 12/2012 | Yoshida | 235/454 |
| 2013/0020386 A1 * | 1/2013 | Yoshida | 235/375 |
| 2013/0050724 A1 * | 2/2013 | Yoshida | 358/1.9 |

\* cited by examiner

| 3 | 0 | 1 | 0 | 0 |
|---|---|---|---|---|
| 0 | 0 | 0 | 2 | 1 |
| 0 | 0 | 2 | 1 | 2 |
| 1 | 3 | 0 | 1 | 0 |
| $0_R$ | 0 | 0 | 0 | 2 |

FIG. 6

METHOD FOR STORING AND READING DATA

CROSS-REFERENCE TO RELATED APPLICATIONS

This application is the US-national stage of PCT application PCT/DE2009/075013, filed 16 Mar. 2009, published 8 Oct. 2009 as 2009/121356, and claiming the priority of German patent application 102008017168.9 itself filed 2 Apr. 2008.

FIELD OF THE INVENTION

The present invention relates to a method of storing data where
- the data to be stored are printed in the form of a dot pattern comprising a plurality of dots on the surface of a printable medium using a printer,
- the dot pattern includes at least one dot pattern block covering a given area on the printable medium, and
- the area that is covered by the at least one dot pattern block on the medium to be printed contains a plurality of subareas of equal size in rows and/or columns and in each of which a respective dot pattern representing a portion of the data to be stored is printed.

The invention also concerns a method of reading out stored data according to this method.

BACKGROUND OF THE INVENTION

On printed media such as books, magazines, and brochures, for example, in the form of machine-readable dot patterns, stored (printed) data may be used, for example, to provide the reader of a printed medium with additional information. This additional information may be, for example, information that cannot be represented on printable media, such as movies or music, for example, or more extensive information that in principle could be represented on the printed medium, but cannot be accommodated in the printed medium because of its volume.

The dot pattern may represent the additional information itself, or may represent a link to the additional information located elsewhere, for example stored on a CD or a computer or retrievable via the internet.

In one possible practical application, next to an entry about a composer in an encyclopedia a dot pattern is printed that represents a link to a piece of music by the composer stored on a CD. If the information about the composer provided in the text is not sufficient for the user of the encyclopedia, the user may obtain additional information via his computer, and may replay the referenced piece of music, for example. For this purpose he connects an optical-dot-pattern reader to his computer, and uses it to scan the dot pattern printed next to the article about the composer and sends it to the computer. The computer or special software installed thereon decodes the dot pattern, and, depending on the content of the decoded data, automatically starts further actions such as playing the piece of music, for example.

Another practical application is a catalog of a travel agency. If one were to include in such a catalog all the details about all trips offered by the travel agency, a catalog would result that would be so large and so expensive to produce that it would not be suitable for distribution to the public. In addition, such a catalog would become outdated very quickly due to changes in fares, new trips included in the offered selection, trips no longer offered, travel schedules no longer current, etc., and updated editions would have to be reprinted within very short time intervals. This may all be avoided by including in the catalog only the base information that does not change or that changes infrequently, and providing the more detailed description of the particular trips as well as the quickly changing information such as travel fares, schedules, etc. via an internet link represented by a dot pattern. The reader of the brochure may initially choose from the catalog the trips of interest, and may then download additional information from the internet, and optionally even make a reservation over the internet. For this purpose he connects his computer to an optical-dot-pattern reader that he uses to scan the dot pattern printed next to the particular travel offer, and sends it to the computer. The computer or special software installed thereon decodes the dot pattern, and depending on the content of the decoded data automatically starts further actions such as, for example, downloading and displaying the desired additional information from the internet.

The size and number of dots of the dot pattern are preferably very small in order to eliminate or at least minimize an objectionable appearance on the printed medium. To ensure that the dot pattern occupies as little space as possible on the printed medium and that a small and inexpensive dot-pattern reader may be used, the spacing between the dots of the dot pattern should also be very small. Despite the dots being as few as possible in number and having the smallest possible size, with small spacing between the dots, it must be possible to reliably print, scan, and decode the dot pattern without errors, this preferably also applying when nonoptimal conditions are present, for example when the size, the spacing, and/or the relative position of the dots with respect to one another deviate or vary from the set-point values due to printing problems, or when the dot pattern is scanned with distortions due to a curvature in the printed medium and/or a nonoptimal position or alignment of the dot-pattern reader.

A method as described above is known from EP 03 710 388 A1, for example. However, the method described in this document does not meet all the prerequisites stated above for reliable, error-free use of this method, also under unfavorable conditions.

A remedy is also not provided by the method described in DE 102 55 926 A1 [U.S. Pat. Nos. 7,726,570, 7,669,774, and 7,328,845), in which the data to be stored are stored in the form of a line pattern.

In the conventional storage and reading methods, the necessary precision in positioning the dot patterns for reproducibly reading the data requires the use of offset printing and hard master copies. Digital printing such as laser printing or ink-jet printing, for example, are not able to ensure the desired precision in the positioning or resolution, since for ink-jet printing even the smallest droplets of ink of the latest product generation on the print media result in excessively large dimensions of the print dots, and for laser printing the print dots have excessively large dimensions due to the electrostatic repellence of the particles.

OBJECT OF THE INVENTION

The object of the present invention, therefore, is to improve the known methods for storing data in the form of a dot pattern comprising a plurality of dots on the surface of a printable medium, as well as the methods for reading data stored in this manner, in such a way that, while using a digital printing process, dot patterns printed on a printable medium may be reliably scanned and decoded without errors.

SUMMARY OF THE INVENTION

In a method of storing data, where the data to be stored are printed in the form of a dot pattern comprising a plurality of dots on the surface of a printable medium using a printer, where the dot pattern includes at least one dot pattern block covering a given area on the printable medium, and where the area covered by the at least one dot pattern block on the medium to be printed contains a plurality of subareas of equal size in rows and/or in columns and in each of which a respective dot pattern representing a portion of the data to be stored is printed, this object is achieved in that each subarea contains one of multiple different base dot patterns, and each of the multiple base dot patterns is composed of two dots that with respect to a virtual reference point are point symmetrical within the respective subarea, and the base dot patterns have at least one of the following characteristics: they differ with respect to the angle of the virtual connecting line between the two dots of the respective base dot pattern relative to a virtual reference line, and/or they have a different spacing between the dots. This method has the advantage of increased tolerance to errors.

It has proven advantageous to print the dot pattern using an ink that absorbs infrared light, in particular infrared light having a wavelength in the range of 900 nm to 980 nm. In this printing method the multiple different base dot patterns are preferably selected from one of the following groups: a group comprising at least three different base dot patterns, a group comprising up to eight different base dot patterns, or a group comprising four different base dot patterns. It has proven to be advantageous when the multiple different base dot patterns differ only with respect to the angle of the virtual connecting line between the two dots of the respective base dot pattern relative to a virtual reference line. In particular, the spacings between the two dots of each base dot pattern may be the same for all base dot patterns. In one preferred embodiment, the area covered by each dot pattern block on the printable medium is a square area. It has proven to be advantageous when the dot pattern includes multiple dot pattern blocks, and the multiple dot pattern blocks are contiguously printed in rows and/or in columns and without a space between them. When the dot pattern includes multiple dot pattern blocks, the multiple dot pattern blocks may contain identical dot patterns, at least in places. In one preferred embodiment of the present invention, the subareas of the at least one dot pattern block, each containing one base dot pattern, are square areas. In addition, the virtual reference point may be the virtual center point of the subarea containing the respective base dot pattern. It has proven to be advantageous when a reference dot pattern composed of multiple dots is printed in a given subarea of each dot pattern block. Furthermore, the subarea containing the reference dot pattern may also contain one of the base dot patterns. It has proven to be advantageous when the subarea containing the reference dot pattern contains only given base dot patterns. It is particularly preferred for the dots of the reference dot pattern to be provided at locations within the subarea at which no dot of one of the base dot patterns can be present, even when the subarea containing the reference dot pattern also contains a base dot pattern. In one advantageous embodiment of the present invention, the reference dot pattern is composed of three dots, one of the dots being situated in the center of the subarea containing the reference dot pattern, and the other two dots being adjacent in the region of the subarea therebelow, the nonprinted virtual connecting line between the two lower dots of the reference dot pattern extending horizontally. In addition, the spacing between the two lower dots of the reference dot pattern may be selected in such a way that it meets at least one of the following conditions: a) the spacing is greater than the spacing between the two dots of each base dot pattern, b) the spacing is 70% of the spacing of the virtual center points from two subareas that are in rows or in columns. It has proven advantageous to select the spacing between the nonprinted virtual connecting line, between the two lower dots of the reference dot pattern, from the upper dot of the reference dot pattern in such a way that it meets at least one of the following conditions: a) the spacing is less than the spacing between the two lower dots of the reference dot pattern, b) the spacing is less than the spacing between the two dots of each base dot pattern, and c) the spacing is 30% of the spacing of the virtual center points from two subareas that are contiguously in rows or in columns. In addition, in the printing method according to the invention the spacing between the two dots of each base dot pattern may be 60% of the spacing of the virtual center points from two subareas that are contiguously in rows or in columns. The spacing of the virtual center points from two contiguous subareas situated in columns is advantageously equal to the spacing of the virtual center points from two contiguously adjacent subareas. It has proven advantageous to use one or more subareas for storing data that allow error recognition or error correction.

In addition, in a method of storing data in which the data to be stored are printed in the form of a dot pattern comprising a plurality of dots on the surface of a printable medium using a printer, where the dot pattern includes at least one dot pattern block covering a given area on the printable medium, and where the area that is covered by the at least one dot pattern block on the medium to be printed contains a plurality of subareas of equal size in rows and/or in columns and in each of which a respective dot pattern representing a portion of the data to be stored is printed, this object is achieved in that a digital printing process is used for the printing. This has the additional advantage that the data may be individualized using the digital printing process.

It has been proven advantageous to use a mass-production process such as an ink-jet process, a thermal sublimation process, a thermal transfer process, or a laser-printing process as the digital printing process. Each subarea preferably has one of the multiple different base dot patterns and/or the reference dot pattern. It is particularly preferable for each of the multiple base dot patterns to be composed of two dots that are point symmetrical with respect to a virtual reference point within the respective subarea. This has the advantage that the configuration of the dots in the base dot pattern increases the reproducibility.

In addition, in a method of reading data stored using one of the above-named storage methods, where an image of at least a portion of the region of the printed medium containing the dot pattern is recorded and from this image the position of at least a portion of the dots contained therein is ascertained, and for each subarea of a dot pattern block, for determining the data, an angle determination method and/[or] length determination method is/are used, the object is achieved in that in the angle determination method, the angle of the virtual connecting line between the dot pair present in the respective subarea is ascertained with respect to a virtual reference line, or the angle of the virtual connecting line between the virtual center point of the respective subarea and one of the two dots that must be contained in the respective subarea is ascertained with respect to the virtual reference line, and the data represented by the dot pattern contained in the affected subarea are determined as a function of the angular range within which the ascertained angle lies, or the object is achieved in that in the length determination method, the spacing between the dots of the dot pair is ascertained and the data representing the dot pattern contained in the affected subarea are determined as a function of the spacing range within which the ascertained spacing lies. On account of the determination of the relative spacing between the centers of gravity of adjacent print dots, the data reading method according to the invention has increased tolerance to variations in position.

The image is preferably recorded by a dot-pattern reader, and the region of the printed medium from which an image is recorded by the dot-pattern reader is illuminated by a light source provided in the dot-pattern reader. The wavelength or the wavelength range of the light emitted by the light source is particularly preferably selected in such a way that either in the region of the printed medium from which an image is recorded by the dot-pattern reader only the dots of the dot pattern to be scanned reflect the light emitted by the light source, or in the region of the printed medium from which an image is recorded by the dot-pattern reader only the dots of the dot pattern to be scanned do not reflect the light emitted by the light source. It has proven advantageous to select the light source from a group comprising an infrared light source, a light source radiating light having a wavelength in the range of 900 to 980 nm, a UV light source, and a light source radiating visible light. In one preferred embodiment of the present invention, the image is recorded by a dot-pattern reader, and the image of the region of the printed medium contained in the dot pattern is recorded by a camera provided in the dot-pattern reader. In this regard it has proven particularly advantageous to select the camera from a camera that is sensitive only to light reflected by the dots of the dot pattern, a camera that is sensitive only to light not reflected by the dots of the dot pattern, an infrared-sensitive camera, a camera that is sensitive to light having a wavelength in the range of 900 to 980 nm, a camera that is sensitive to UV light, a camera that is sensitive to visible light, and a camera that is sensitive to a given portion of visible light. Furthermore, in the method according to the invention, when the pixels of the recorded image have or may have more than two different intensity values, a transformation of the image is carried out according to which the pixels of the image can have only a minimum or a maximum intensity value. In this regard, the threshold value used for the transformation may correspond to the average intensity value of a given number of pixels of the recorded image.

In this method it is advantageous that a search is made for dots of the dot pattern contained in the recorded image, starting from the center of the image and progressing outwardly in a spiral fashion. It has proven to be particularly advantageous that when the dot pair contained in three contiguous L-shaped subareas has been found, the position of the center points of the further subareas adjacent thereto is computed, and the search for the dot pairs contained in the respective subareas is limited to an annular region extending around the computed center point. In addition, in this method a subarea containing a dot in its center may be treated as the subarea containing the reference dot pattern, and the dot present in the center of the subarea may be treated as one of the dots of the reference dot pattern. It has proven advantageous to use the virtual connecting line between the other two dots of the reference dot pattern as the reference line.

A further aspect of the present invention relates to use of the reading of stored data in microdot systems for user-guided control of display or playback systems, for example. In one method of reading the data stored in microdot systems, a change in the angle is detected using a rotational motion of a dot-pattern reader relative to the printed medium. The absolute change in the angle or the rate of change in the detected angle may cause appropriate fast-forwarding or rewinding of a movie or an appropriate adjustment of the sound level, for example as a function of the reading region on the printed medium. Thus, the data stored in the microdot system may be used, for example, to retrieve a given movie sequence for which the user is able to selectively influence or select the playback speed, brightness, sound level, or also the language version. Particularly simple access to given movie sequences or pieces of music, for example, and intuitive control may be achieved for appropriately printed accompanying media for video and/or audio information, for example, present in digital form. This also allows the user to steer a race car in a game, for example. These applications have the advantage that they allow particularly intuitive control for a large number of systems. The functions of potentiometers or switches may thus be achieved for many types of controls in conjunction with the data stored on the printed medium. Alternatively and/or additionally, a change in the angle of inclination of the dot-pattern reader with respect to the printed medium may be used for control. This control method according to the invention is not limited to the data stored according to the printing method described above, but, rather, may be used for all microdot systems having angular information, and/or for microdot systems in which the angle of inclination of the dot-pattern reader with respect to the printed medium may be detected.

BRIEF DESCRIPTION OF THE DRAWING

The invention is described in greater detail below with reference to on one illustrated embodiment, with reference to the following figures in which:

FIG. 6 shows the dot pattern block shown in FIG. 2, providing the numerical values associated with the base dot patterns contained in the dot pattern block shown in FIG. 2.

DETAILED DESCRIPTION OF THE INVENTION

At the outset, it is noted that the figures are only schematic illustrations that are not true to scale.

The system described below comprises the following:
 a method of storing data where the data to be stored are printed in the form of a dot pattern comprising a plurality of dots on the surface of a printable medium using a printer, and
 a method of scanning and decoding the dot pattern printed on the surface of the printable medium.

In most cases the printable medium is paper, i.e. a page of a book, a newspaper, a magazine, a brochure, etc. However, it could also be any other given printable medium including but not limited to, for example, plastic or metal films, etc.

In principle, the dot pattern may be printed at any given location on the medium to be printed. This region may be designated, for example, by a frame or colored background surrounding the region. However, the dot pattern may also be integrated into an image printed on the printed medium, or may be printed over an image.

Figure 1:
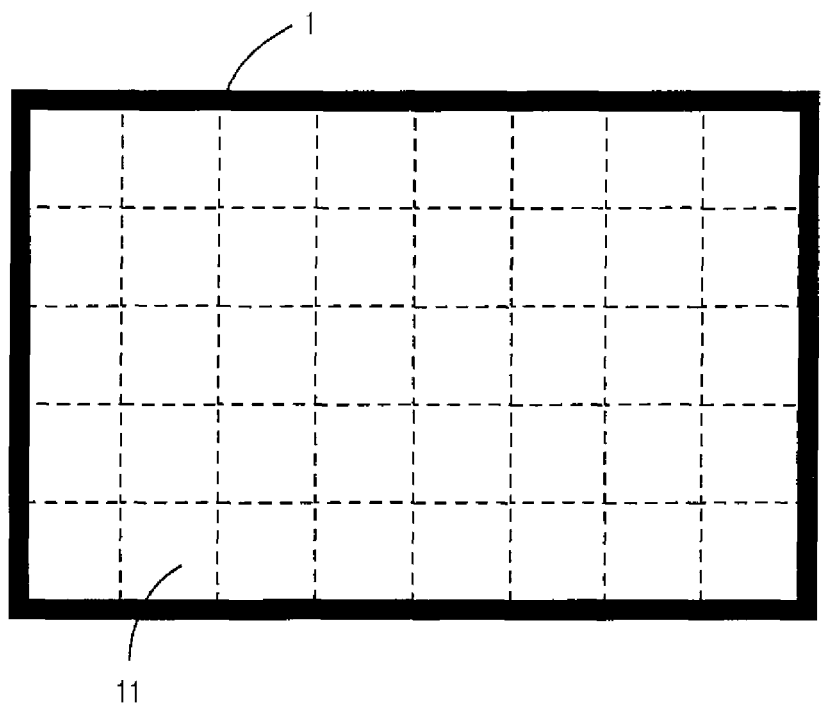
FIG. 1 shows a region surrounded by a frame, within which the dot pattern that is generated or scanned and decoded using the method described below is situated.

A dot pattern region surrounded by a frame is shown in FIG. 1. The frame is denoted by reference numeral 1. The frame 1 is used solely for marking the region on the printed medium that contains the dot pattern. By means of the frame 1, the user of the system is able to identify the particular location at which he must place the dot-pattern reader in order to read the dot pattern. The frame 1 is not necessary for the scanning and decoding of the dot pattern, described in greater detail below.

In the example under consideration, a plurality of dot pattern blocks 11 in rows and in columns and containing identical dot patterns is provided within the frame 1. However, it is not absolutely necessary to provide a plurality of identical dot pattern blocks 11. The entire dot pattern may in principle be composed of any given number of dot pattern blocks 11 (even just a single dot pattern block 11), and the provided dot pattern blocks 11 may be dot pattern blocks 11 containing identical dot patterns, or dot pattern blocks 11 containing different dot patterns.

In the example under consideration, the multiple dot pattern blocks 11 are situated directly, i.e. without a spacing, in rows and in columns. However, it could also be provided that spaces are left between the individual dot pattern blocks 11.

The dashed dividing lines shown in FIG. 1 between the individual dot pattern blocks 11 are only virtual, nonprinted lines. To avoid misunderstanding, it is noted that for the sake of clarity the dot patterns contained in the dot pattern blocks 11 are not shown in FIG. 1.

Figure 2:
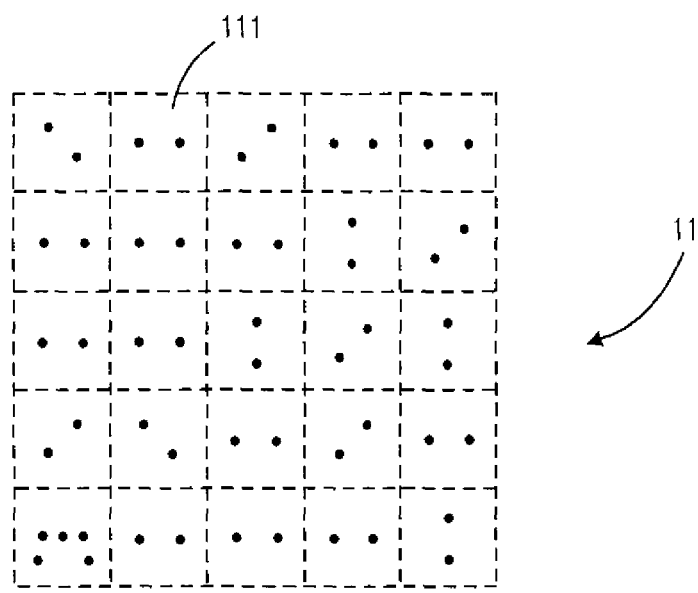
FIG. 2 shows one of the dot pattern blocks contained in the region shown in FIG. 1.

A single dot pattern block 11 is shown in FIG. 2. In the example under consideration, the dot pattern block 11 covers a square area on the medium to be printed, and is divided into a plurality of also square subareas 111. However, neither the dot pattern blocks 11 nor the subareas 111 must have a square shape, and could also have any other given shape. Providing nonsquare subareas 111 in particular may however make it more difficult to ascertain the data represented by the dot pattern.

The dashed dividing lines between the individual subareas 111 shown in FIG. 2 are only virtual, nonprinted lines.

The individual subblocks 111 are in rows and in columns and in the shape of a matrix. The dot pattern block 11 shown in FIG. 2 comprises 25 subareas 111 configured in a 5×5 matrix. However, a dot pattern block 11 may also contain any given greater or smaller number of subareas 111. The number of subareas 111 per dot pattern block 11 depends on
1) the particular resolution (dots per inch (dpi)) at which the dot pattern is printed,
2) the volume of data that could be stored in a dot pattern block 11, and/or the number of different types of data that could be stored in a dot pattern block 11, and
3) the size of the region from which a dot-pattern reader used in reading the data is able to scan an image in a single pass (to allow a small, hand-held dot-pattern reader to be used, the area covered by a dot pattern block 11 on the printable medium is preferably no larger than 2×2 mm).

A dot pattern that represents a portion of the data to be stored is printed within each subarea 111. Stated more precisely, each subarea 111 contains one of multiple different base dot patterns.

In the example under consideration, the operation is carried out using four different base dot patterns. These base dot patterns are shown in FIGS. 3A through 3D. FIGS. 3A through 3D each show a subarea 111 with a base dot pattern contained therein. Each base dot pattern is composed of two dots, denoted by reference character P in FIGS. 3A through 3D. Each dot P is point symmetrical with respect to a virtual, nonprinted center point VM of the respective subarea. However, the dots P could also be point symmetrical with respect to any other given virtual reference point, not representing the center point, within the respective subarea. In addition, it is not absolutely necessary to provide four different base dot patterns. The number of the various base dot patterns may also be greater or less than four; in the present case a number between 3 and 8 is regarded as optimal.

The various base dot patterns differ by virtue of the alignment of a virtual connecting line, shown in a dashed pattern in FIGS. 3A through 3D that connects the two dots P of a respective base pattern. In the example under consideration, in the first base dot pattern shown in FIG. 3A this connecting line extends horizontally; in the second base dot pattern shown in FIG. 3B it is rotated counterclockwise by 45°; in the third base dot pattern shown in FIG. 3C it is further rotated counterclockwise by 45°; i.e. a vertical form; and in the fourth base dot pattern shown in FIG. 3D it is further rotated counterclockwise by 45°.

Figure 3A:
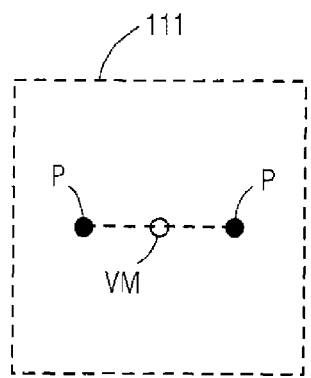
FIG. 3A shows a first base dot pattern.
Figure 3B:
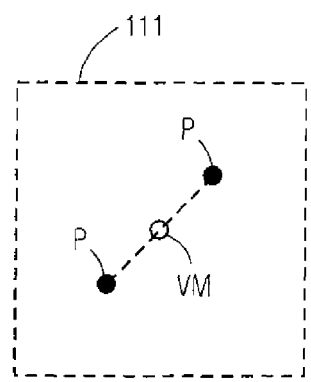
FIG. 3B shows a second base dot pattern.
Figure 3C:
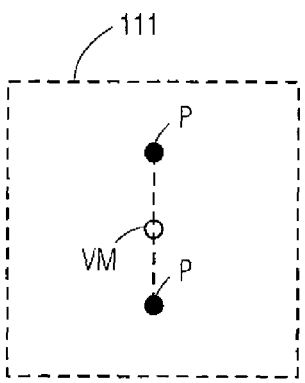
FIG. 3C shows a third base dot pattern.
Figure 3D:
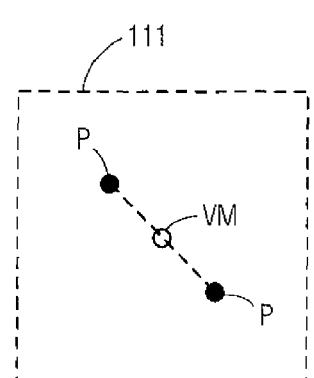
FIG. 3D shows a fourth base dot pattern.
Figure 6:
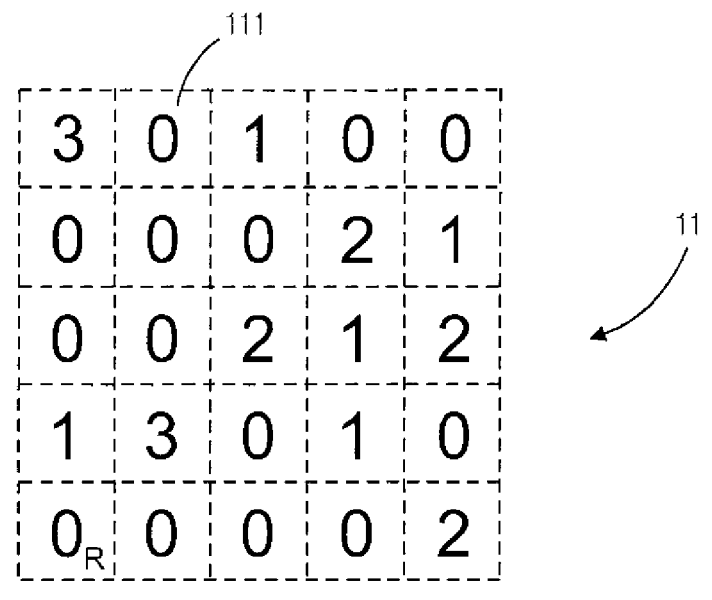

In the example under consideration, the first base dot pattern shown in FIG. 3A represents the value 0, the second base dot pattern shown in FIG. 3B represents the value 1, the third base dot pattern shown in FIG. 3C represents the value 2, and the fourth base dot pattern shown in FIG. 3D represents the value 3. FIG. 6 shows an illustration corresponding to FIG. 2 in which, instead of the base dot patterns, the values respectively associated therewith are indicated in the respective subareas 111. To avoid misunderstanding, it is pointed out that the dot pattern block shown in FIG. 6 is not a printed dot pattern block. The dot pattern block shown in FIG. 2 is printed.

Figure 4:
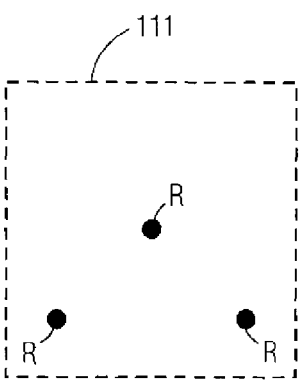
FIG. 4 shows a first reference dot pattern.

Of the subareas 111 of each dot pattern block 11, in the example under consideration the subarea 111 in the lower left corner contains a reference dot pattern in addition to the base dot pattern. This reference dot pattern, shown in FIG. 4, is composed of three dots R that are present at locations at which none of the base dot patterns has a dot P. One of the reference dots R is situated exactly in the center of the subarea 111 containing the reference dot pattern; the other two reference dots R are situated in a region located below the centrally positioned reference dot R, so that the virtual, i.e. nonprinted, connecting line between the two lower reference dots R extends horizontally.

Figure 5:
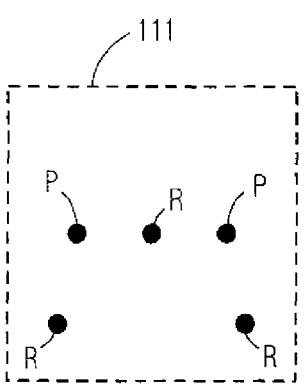
FIG. 5 shows a dot pattern composed of the first reference dot pattern and the first base dot pattern.

In principle, the subarea 111 containing the reference dot pattern may also contain any given one of the four base dot patterns. In the present case, however, it is preferred that either the first base dot pattern shown in FIG. 3A or the third base dot pattern shown in FIG. 3C is used in combination with the reference dot pattern. FIG. 5 illustrates the case in which a subarea 111 contains a dot pattern resulting from a combination or merging of the reference dot pattern and the first base dot pattern shown in FIG. 3A.

It is not absolutely necessary for the subarea 111 containing the reference dot pattern to be the lower left subarea of the dot pattern block 11 that contains this subarea. The reference dot pattern may also be contained in any other given subarea 111 of the dot pattern block 11.

The individual dots of the dot pattern are preferably so small that they are invisible or hardly visible to the human eye, but on the other hand must be large enough that they leave enough ink on the medium so that they are unequivocally scannable by the dot-pattern reader, described in greater detail below. The reference dots are also preferably so small that they are not copied, or are copied only incompletely, when the printed medium is copied using a copying machine.

In the example under consideration, the spacings between the dots of the dot pattern are as follows:
1) The spacing between the two dots of each base dot pattern is approximately 60% of the spacing of the virtual center points VM from two subareas 111 contiguously in rows or in columns.
2) The spacing between the two lower dots R of the reference dot pattern is approximately 70% of the spacing of the virtual center points VM from two subareas 111 contiguously in rows or in columns.
3) The spacing of the virtual connecting line between the two lower dots R of the reference dot pattern from the upper dot R of the reference dot pattern is approximately 30% of the spacing of the virtual center points VM from two subareas 111 contiguously in rows or in columns.
4) Since the subareas 111 in the example under consideration are square, the spacing of the virtual center points VM from two subareas 111 contiguously situated in columns is equal to the spacing of the virtual center points VM from two subareas 111 contiguously adjacent one another.

The referenced spacings in each case relate to the center of the respective dots.

There is no limitation to the referenced spacings 1) through 3). This applies for the individual spacings (for example, spacing 1) could also be only 60% of the spacing of the virtual center points VM from two subareas 111 contiguously in rows or in columns), as well as for the dimensional ratios of the referenced spacings with respect to one another (for example, spacing 1) could also be greater than spacing 2)). The individual spacings should clearly differ from one another only to the extent that in the reading of the dot pattern it may be unambiguously identified whether a particular dot is a dot of a base dot pattern or is a dot of the reference dot pattern, and which dots together form a base dot pattern.

If the dot pattern block 11 shown in FIG. 2 is printed at a resolution of 2400 dpi (dots per inch), and 37×37 dots is defined as the size of each of the subareas 111, the dot pattern block 11 shown in FIG. 2 is 185×185 dots, or 1.958×1.958 mm, in size.

Because digital printing has much lower reproducibility and exactness compared to offset printing, there is a preconception among experts that for printing methods according to the preamble of independent claim 1, only offset printing may be used in order to ensure precise, absolute positioning of the dots of the dot pattern for error-free reading of the data. However, in studies for the present invention it has been found that digital printing may also be used for storing the data when the relative orientation of the centers of gravity of adjacent dots, and not the absolute orientation of the dots, is used for determining the data. In addition to more favorable manufacturing costs for the digital printing, another advantage is that in contrast to offset processes, in digital printing the data may be individualized.

For products subjected to severe stress, for example certain playing or trading cards, for prolonging the useful life it is advantageous to print the dot patterns at a higher resolution. If the area of 2×2 mm covered by the dot pattern block 11 shown in FIG. 2 is not intended to be enlarged, the number of subareas 111 per dot pattern block 11 must be reduced.

For example, instead of the dot pattern block 11 shown in FIG. 2, a dot pattern block 11 comprising 3×3=9 subareas 111 could be used that is 180×180 dots, or 1.905×1.905 mm, in size.

When the subarea 11 containing the reference dot pattern can contain only one of two different base dot patterns, 2¹ different information items may be stored in the dot pattern block shown in FIG. 2. When a dot pattern block 11, composed of only 3×3 subareas 111, is used that is better suited for products subjected to severe stress, 2¹ different information items may be stored in a dot pattern block.

When it is not necessary to be able to store this many different information items, a portion of the subareas 111 may be used to store data that allows error recognition or error correction.

In the example shown in FIG. 2, in the example under consideration, of the total 25 subareas 111 only 10 subareas are needed for storing useful data. This involves subarea numbers 2 through 11; the subareas are numbered consecutively from 1 to 25, beginning with the subarea at the lower left corner containing the reference dot pattern as number 1, and the subareas are consecutively numbered line by line, in each case from left to right. The printed dot patterns (0002130100) printed in subarea numbers 2 through 11 are repeated in subareas 16 through 25. A coded check sum is written in the remaining subarea numbers 12 through 15.

To form the uncoded check sum, the values associated with the respective dot patterns printed in subareas 2 through 11 are multiplied by a respective associated value, and the results of the multiplications are added. This is shown in the following table:

|  | Subarea number | | | | | | | | | |
| --- | --- | --- | --- | --- | --- | --- | --- | --- | --- | --- |
|  | 2 | 3 | 4 | 5 | 6 | 7 | 8 | 9 | 10 | 11 |
| Dot pattern value | 0 | 0 | 0 | 2 | 1 | 3 | 0 | 1 | 0 | 0 |
| Multiplier | 10 | 9 | 8 | 7 | 6 | 5 | 4 | 3 | 2 | 1 |
| Result | 0 | +0 | +0 | +14 | +6 | +15 | +0 | +3 | +0 | +0 | =38 |

Thus, in the example under consideration the uncoded check sum is 38. This uncoded check sum is coded in such a way that when the dot pattern values corresponding to the coded check sum are multiplied in each case by an associated value and the multiplication results are added, the uncoded check sum is obtained as the result. This is shown in the following table:

|  | Subarea number | | | |
| --- | --- | --- | --- | --- |
|  | 12 | 13 | 14 | 15 |
| Coded check sum | 0 | 2 | 1 | 2 |
| Multiplier | 64 | 16 | 4 | 1 |
| Result | 0 | +32 | +4 | +2 | =38 |

Accordingly, the coded check sum is 0212. That is, the first base dot pattern shown in FIG. 3A is printed in subarea number 12, the third base dot pattern shown in FIG. 3C is printed in subarea numbers 13 and 15, and the second base dot pattern shown in FIG. 3B is printed in subarea number 14.

Subarea number 1 containing the reference dot pattern has been disregarded in the check sum computation. This is because this subarea (containing the reference dot pattern) can contain only the first base dot pattern shown in FIG. 3A or the third base dot pattern shown in FIG. 3C, and these two base dot patterns may be differentiated very well, so that there is only negligible risk of error in reading the printed dot pattern printed in subarea number 1.

For a dot pattern block 11 comprising only 3×3=9 subareas 111 it may be provided, for example, that of the total 9 subareas only 8 subareas, or stated more precisely, only subarea numbers 1 through 8, are used for the storage of useful data, and a check digit is written in subarea number 9.

This check digit is ascertained in two steps. First, the is values associated in each case with the base dot patterns printed in subareas 2 through 8 are multiplied by a respective associated value. The results of the multiplications involving dot pattern values of subareas having an even number are added to give a first result, and the results of the remaining multiplications are added to give a second result. This is shown by way of example in the following table:

|  | Subarea number | | | | | | | |
| --- | --- | --- | --- | --- | --- | --- | --- | --- |
|  | 2 | 3 | 4 | 5 | 6 | 7 | 8 | |
| Dot pattern value | 0 | 0 | 1 | 3 | 0 | 0 | 0 | |
| Multiplier | 7 | 6 | 5 | 4 | 3 | 2 | 1 | |
| Result |  | 1 |  | +5 |  | +0 |  | +0 | =5 |
| Result | 1[2] |  | +0 |  | +12 |  | +0 | =12 |

Depending on result 1 and result 2, the check digits are then defined according to the following criteria:
  When result 1 is an even number and result 2 is an even number, the first base dot pattern shown in FIG. 3A is printed as a check digit in subarea number 9.
  When result 1 is an even number and result 2 is an odd number, the second base dot pattern shown in FIG. 3B is printed as a check digit in subarea 9.
  When result 1 is an odd number and result 2 is an even number, the third base dot pattern shown in FIG. 3C is printed as a check digit in subarea 9.
  When result 1 is an odd number and result 2 is an odd number, the fourth base dot pattern shown in FIG. 3D is printed as a check digit in subarea number 9.

The dot pattern printed on the printable medium represents machine-readable information that, unlike the situation for a bar code, for example, is not perceived, or in any case is not perceived as objectionable, by the human eye. As a result of the small size that the dots of the dot pattern may have, and the spacings between the dots that, although small, are relatively large compared to the dot size, the dot pattern appears as only a light gray blur to the human eye.

For ascertaining the information stored in the form of the dot pattern, a dot-pattern reader is required that is connected to a data processor such as a PC, for example. The dot-pattern reader is preferably a hand-held device, for example in the form of a stylus. The dot-pattern reader is placed over the region containing the dot pattern on the medium printed with the dot pattern, and generates an image from at least a portion of the region containing the dot pattern. Since in the example under consideration the dot pattern contains a plurality of dot pattern blocks 11 that have identical dot patterns, the exact location at which the dot-pattern reader is placed is not critical. The dot-pattern reader sends the data that represent the scanned image to the data processor. From the image recorded by the dot-pattern reader, the data processor extracts the dot pattern contained therein, ascertains therefrom the data that represent the dot pattern, and based on the data carries out the operation specified by the data. The operation to be carried out may be any operation that the data processor is able to perform, including but by no means limited to, for example, displaying or replaying text, image, or audio data, whereby these data may be stored in the data processor, on a CD, a DVD, or any other given data carrier, or may be loaded from the internet or from some other location. The information to be displayed or replayed may also be information contained in the read dot pattern. In particular when the operation to be carried out by the data processor includes internet access, it may also be provided that in this way a reservation order is made, or some other interaction is carried out at the same time.

In the example under consideration, the dot-pattern reader has an infrared light source for exposing the region on the printed medium to be scanned by the dot-pattern reader, and a camera that is sensitive to infrared light. Such a camera is, for example, a camera whose sensor is sensitive to infrared light, and for which only a filter permeable to infrared light is situated upstream from the sensor (thus allowing the use of inexpensive sensors that are not sensitive to infrared light). In the example under consideration, the infrared light that is emitted by the infrared light source and to which the camera is sensitive has a wavelength of approximately 900 to 980 nm, although there are no limitations in this regard.

In the present case, i.e. when infrared light is used for scanning dot patterns, the ink used to print dots of the dot pattern is preferably an infrared light-absorbing ink. This is generally an ink containing a carbon fraction, and that thus appears black to the human eye. As mentioned above, the human eye still perceives the dot pattern as a light gray blur. As also mentioned above, the dot pattern may also be a component of an image printed on the printed medium, or may be printed over an image. In this case the black ink used for printing the image would have to be a black ink that is carbon-free, i.e. that does not absorb infrared light; only the image components that represent the dot pattern may be printed with black ink containing carbon.

In the example under consideration, the camera is a color camera that provides an image comprising 352×288 pixels or 320×240 pixels, for example. For each pixel, the image data contain a red intensity value comprising 1 byte, a green intensity value comprising 1 byte, and a blue intensity value comprising 1 byte. Since in the present case only infrared light strikes the sensor, the intensity values for all three colors are always the same (the sensor elements in the camera that detect the intensity values for the various colors are equally sensitive to infrared light). It is therefore sufficient for the image evaluation to be based on the intensity values of only one of the three color channels, it being unimportant which color channel is used.

It is apparent and requires no further explanation that a black/white camera may also be used, in which case each pixel comprises only an intensity value of 1 byte, for example, that is independent of the color.

For the sake of completeness, it is pointed out here that it is not absolutely necessary to use a dot-pattern reader having an infrared light source and an infrared-sensitive camera. For example, it would also be possible to use a dot-pattern reader having a UV light source and a UV light-sensitive camera, or to operate with any other given light wavelengths. Of course, in that case the characteristics of the printing inks used to print the dot pattern and the portions of the print image not representing the dot pattern would have to be appropriately modified. The exact manner in which the dot pattern is scanned is not of primary importance. The most important factor is that the dot-pattern reader generates image data from which the data processor is able to ascertain the dots of the dot pattern.

The data processor selects from the center of the image supplied to it by the dot-pattern reader a small region whose size corresponds to the size of a subarea 111, for example, and ascertains the average intensity value for this region. If the image is very dark, i.e. has an average intensity value less than 64, it is assumed that the camera has not detected a dot pattern, and the image evaluation is terminated.

The image is then transformed into a black/white image having only the intensities 0 (black) and 255 (white). The previously ascertained average intensity value is used as the initial threshold value. The black/white transformation begins in the center of the image and progresses outwardly in a spiral fashion. Each pixel of the image is compared to the threshold value, and the intensity of the respective pixel is set to either 0 or 255, depending on the result of the comparison. The threshold value used is continuously updated during the black/white transformation. The current threshold value in each case corresponds to the average intensity of the most recently transformed 32 pixels before their transformation.

After the image received from the dot pattern scanning device is transformed into a black/white image, a search is made for dots of the dot pattern to be scanned, starting in the center of the image and progressing outwardly in a spiral fashion. Based on the relative position and the spacings between the dots that are found, the particular dots that are a related dot pair that represent a base dot pattern may be ascertained. As soon as the dot pairs that represent the base dot patterns of three L-shaped contiguous subareas 111, are found, the search for the base dot patterns contained in the adjacent subareas 111 is simplified. Namely, from the information that is then present the location of the virtual center points of the adjacent subareas 111 may be computed, and the search for the base dot patterns contained in the adjacent subareas may be limited to an annular region that extends around the virtual center point.

When a dot located in the center of a subarea 111 is found in the search for further dots of the dot pattern, it is determined that the affected subarea is the subarea that contains the reference dot pattern, and a targeted search is also made for the other two dots R of the reference dot pattern. The virtual connecting line between these two other dots R of the reference dot pattern is used as a reference line that is required in the subsequent dot pattern evaluation.

Since the position of the subarea 111 within the dot pattern block 11 containing the reference dot pattern is known, for all subareas 111 of the dot pattern block 11 the position of the dots contained in the respective subareas may then be ascertained, as well as the angle of the virtual connecting line between the two dots of the base dot pattern contained in the respective subarea with respect to the virtual reference line.

If this angle is in the range between −22° (or)+338° and +22°, or between +158° and +202°, it is determined that the base dot pattern contained in the affected subarea 111 is the first base dot pattern shown in FIG. 3A, and the value 0 is associated with the dot pattern contained in the affected subarea 111.

If the angle is in the range between +22° and +67° or between +203° and +247°, it is determined that the base dot pattern contained in the affected subarea 111 is the second base dot pattern shown in FIG. 3B, and the value 1 is associated with the dot pattern contained in the affected subarea 111.

If the angle is in the range between +68° and +112° or between +248° and +292°, it is determined that the base dot pattern contained in the affected subarea 111 is the third base dot pattern shown in FIG. 3C, and the value 2 is associated with the dot pattern contained in the affected subarea 111.

If the angle is in the range between +113° and +157° or between +293° and [+]337°, it is determined that the base dot pattern contained in the affected subarea 111 is the fourth base dot pattern shown in FIG. 3D, and the value 3 is associated with the dot pattern contained in the affected subarea 111.

In general terms, this means that a given base dot pattern is identified as this base dot pattern even when the angle between the virtual connecting line between the two dots of the affected base dot pattern with respect to the virtual reference line deviates between −X° and +Y° from the set-point angles shown in FIGS. 3A through 3D. X° and Y° are a function of the angular difference between the set-point angles of the virtual connecting lines of the various base dot patterns that are adjacent in the clockwise or counterclockwise direction, respectively. Stated more precisely, in each case this is slightly less than one-half the angular difference. As shown in FIGS. 3A through 3D and with reference to the description thereof, the set-point angles of the virtual connecting lines with respect to the virtual reference line are 0° or 180° for the first base dot pattern shown in FIG. 3A,
45° or 225° for the second base dot pattern shown in FIG. 3B,
90° or 270° for the third base dot pattern shown in FIG. 3C, and
135° or 315° for the fourth base dot pattern shown in FIG. 3D.

Thus, the angular difference between the set-point angle of the virtual connecting line of the first base dot pattern shown in FIG. 3A and the set-point angle of the virtual connecting line adjacent thereto in the clockwise direction, i.e. of the virtual connecting line of the fourth base dot pattern shown in FIG. 3D, is 45°, and the angular difference between the set-point angle of the virtual connecting line of the first base dot pattern shown in FIG. 3A and the set-point angle of the virtual connecting line adjacent thereto in the counterclockwise direction, i.e. of the virtual connecting line of the fourth [sic; second] base dot pattern shown in FIG. 3B, is also 45°, the angular difference between the set-point angle of the virtual connecting line of the second base dot pattern shown in FIG. 3B and the set-point angle of the virtual connecting line adjacent thereto in the clockwise direction, i.e. of the virtual connecting line of the first base dot pattern shown in FIG. 3A, is 45°, and the angular difference between the set-point angle of the virtual connecting line of the second base dot pattern shown in FIG. 3B and the set-point angle of the virtual connecting line adjacent thereto in the counterclockwise direction, i.e. of the virtual connecting line of the third base dot pattern shown in FIG. 3C, is also 45°, etc. As a result, in the example under consideration the angle X, up to which the ascertained virtual connecting line may be skewed in the clockwise direction with respect to the set-point angle of the first base dot pattern so that the first base dot pattern is still identified as the first base dot pattern, is slightly less than one-half of 45°, and the angle Y, up to which the ascertained virtual connecting line may be skewed in the counterclockwise direction with respect to the set-point angle of the first base dot pattern so that the first base dot pattern is still identified as the first base dot pattern, is also slightly less than one-half of 45°, the angle X, up to which the ascertained virtual connecting line may be skewed in the clockwise direction with respect to the set-point angle of the second base dot pattern so that the second base dot pattern is still identified as the second base dot pattern, is slightly less than one-half of 45°, the angle Y, up to which the ascertained virtual connecting line may be skewed in the counterclockwise direction with respect to the set-point angle of the second base dot pattern so that the first [sic; second] base dot pattern is still identified as the second base dot pattern, is also slightly less than one-half of 45°, etc.

That is, in the example under consideration both X and Y are 22°, so that a respective dot pattern is identified as the first base dot pattern when the detected angle of the virtual connecting line with respect to the virtual reference line is in the range of 0° (or) 180°±22°, as the second base dot pattern when the detected angle of the virtual connecting line with respect to the virtual reference line is in the range of 45° (or) 225°±22°, as the third base dot pattern when the detected angle of the virtual connecting line with respect to the virtual reference line is in the range of 90° (or) 270°±22°, and as the fourth base dot pattern when the detected angle of the virtual connecting line with respect to the virtual reference line is in the range of 135° (or) 315°±22°.

In the example under consideration, X and Y are equal due to the uniform distribution of the virtual connecting lines of the various base dot patterns. Depending on the appearance of the various base dot patterns, however, X and Y may also be different, and the values for X, as well as the values for Y, may be different for the various base dot patterns.

In even more general terms, it may be provided that a respective dot pattern is identified as the first base dot pattern when the detected angle of the virtual connecting line is in the range of 0°X1° and 0°±Y1°, or is between 180°-X1° and 180°±Y1°, as the second base dot pattern when the detected angle of the virtual connecting line is in the range of 45°-X2° and 45°±Y2°, or is between 225°-X2° and 225°±Y2°, as the third base dot pattern when the detected angle of the virtual connecting line is in the range of 90°-X3° and 90°±Y3°, or is between 270°-X3° and 270° Y3°, and as the fourth base dot pattern when the detected angle of the virtual connecting line is in the range of 135°-X4° and 135°±Y4°, or is between 315°-X4° and 315°±Y4°, wherein X1 through X4 and Y1 through Y4, independently of one another, may have any given value, but the sums of X1 and Y4, X2 and Y1, X3 and Y2, and X4 and Y3 are preferably not greater than the respective angular spacings between the set-point angles of the virtual connecting lines.

Notwithstanding, it is not absolutely necessary to operate with the virtual connecting lines between the two dots of the base dot pattern. Instead, operations could also be carried out with the virtual connecting line between the virtual center point of the affected subarea, and with only one of the two dots that each subarea must in fact contain. The virtual center points of the subareas may be ascertained by computer at least when not all subareas of a respective dot pattern block have been incompletely printed or scanned. Also in cases in which a subarea contains only a single dot or only a single dot has been identified as the result of any type of error, the information contained in the affected subarea may then be reliably ascertained.

When the read dot pattern block also contains data that allow error recognition and/or error correction, a final check may be made concerning whether the data generated from the dot pattern have been determined in an error-free manner, and if necessary a correction or a repetition of the reading and evaluation operation may be carried out.

In this illustrated embodiment the angular range is 180°/(number of base patterns), and the tolerance angle is less than ½* angular range.

It follows from the preceding description that the data represented by the dot pattern may be correctly determined, even when the detected positions of the dots of the dot pattern deviate greatly from their respective set-point position. This applies for deviations of the spacings between dots from the set-point value, as well as for deviations in the angle of the virtual connecting line that connects the two dots of a base dot pattern with respect to the virtual reference line. Consequently, neither inexactness in printing of the dot pattern, nor a nonplanar position of the print medium in the detection of the dot pattern by the camera, nor an imprecisely operating camera immediately results in an error-free determination of the data represented by the dot pattern. The described system is extremely tolerant with respect to the actual dot shifts and dot pattern scanning errors resulting from the mentioned problems as well as other problems. Notwithstanding, the dot pattern is also hardly perceivable to the human eye on account of the small number of dots, the small size of the dots, and the spacings between the dots that, although small, are large compared to the dot size.

The invention claimed is:

1. A method of storing data, where
the data to be stored are printed in the form of a dot pattern comprising a plurality of dots on the surface of a printable medium using a printer,
the dot pattern includes at least one dot pattern block covering a given area on the printable medium, and
the area that is covered by the at least one dot pattern block on the medium to be printed contains a plurality of subareas of equal size in rows and/or in columns and in each of which a respective dot pattern representing a portion of the data to be stored is printed,
wherein
each subarea contains one of multiple different base dot patterns,
each of the multiple base dot patterns is composed of two dots that with respect to a virtual reference point are point symmetrical within the respective subarea, and
the base dot patterns have at least one of the following characteristics:
they differ with respect to the angle of the virtual connecting line between the two dots of the respective base dot pattern relative to a virtual reference line, and/or
they have a different spacing between the dots, and
the reference dot pattern is composed of three dots, one of the dots being situated in the center of the subarea containing the reference dot pattern, and the other two dots being thereadjacent in the region of the subarea therebelow and the nonprinted virtual connecting line between the two lower dots of the reference dot pattern having a horizontal form.

2. The method according to claim 1, wherein the dot pattern is printed using an ink that absorbs infrared light having a wavelength in the range of 900 nm to 980 nm.

3. The method according to claim 1, wherein the multiple different base dot patterns are selected from one of the following groups:
a group comprising at least three different base dot patterns, a group comprising up to eight different base dot patterns, or a group comprising four different base dot patterns.

4. The method according to claim 1, wherein the multiple different base dot patterns differ only with respect to the angle of the virtual connecting line between the two dots of the respective base dot pattern relative to a virtual reference line.

5. The method according to claim 1, wherein the spacings between the two dots of each base dot pattern are the same for all base dot patterns.

6. The method according to claim 1, wherein the virtual reference point is the virtual center point of the subarea containing the respective base dot pattern.

7. The method according to claim 1, wherein the dots of the reference dot pattern are provided at locations within the subarea at which no dot of one of the base dot patterns can be present, even when the subarea containing the reference dot pattern also contains a base dot pattern.

8. The method according to claim 1, wherein the spacing between the two lower dots of the reference dot pattern is selected in such a way that it meets at least one of the following conditions:

the spacing is greater than the spacing between the two dots of each base dot pattern, the spacing is 70% of the spacing of the virtual center points from two subareas that are in rows or in columns.

9. The method according to claim 1 wherein a spacing between the nonprinted virtual connecting line, between the two lower dots of the reference dot pattern from the upper dot of the reference dot pattern is selected in such a way that it meets at least one of the following conditions:

the spacing is less than a spacing between the two lower dots of the reference dot pattern, the spacing is less than a spacing between the two dots of each base dot pattern, and the spacing is 30% of a spacing of the virtual center points from two subareas that are contiguously in rows or in columns.

10. The method according to claim 1, wherein a spacing between the two dots of each base dot pattern is 60% of a spacing of the virtual center points from two subareas that are contiguously in rows or in columns.

11. The method according to claim 1, wherein at least one of the subareas is used to store data that allow error recognition or error correction.

12. A method of reading stored data, the method comprising the steps of:

printing the data to be stored in the form of a dot pattern comprising a plurality of dots on the surface of a printable medium using a printer, the dot pattern including at least one dot pattern block covering a given area on the printable medium, an area covered by the at least one dot pattern block on the medium to be printed containing a plurality of subareas of equal size in rows and/or in columns and in each of which a respective dot pattern representing a portion of the data to be stored is printed, each subarea containing one of multiple different base dot patterns, each of the multiple base dot patterns being composed of two dots that with respect to a virtual reference point are point symmetrical within the respective subarea, the base dot patterns having at least one of the following characteristics:

they differ with respect to the angle of the virtual connecting line between the two dots of the respective base dot pattern relative to a virtual reference line, and/or they have a different spacing between the dots recording an image of at least a portion of the region of the printed medium containing the dot pattern, ascertaining the position of at least a portion of the dots contained therein from the image, using for each subarea of a dot pattern block, for determining the data an angle determination method and/or a length determination method, wherein in the angle determination method the angle of the virtual connecting line between the dot pair present in the respective subarea is ascertained with respect to a virtual reference line, or the angle of the virtual connecting line between the virtual center point of the respective subarea and one of the two points that must be contained in the respective subarea is ascertained with respect to the virtual reference line, and the data represented by the dot pattern contained in the affected subarea are determined as a function of the angular range within which the ascertained angle lies, the spacing between the dots of the dot pair is ascertained, the data representing the dot pattern contained in the affected subarea are determined as a function of the spacing range within which the ascertained spacing lies, making a search for dots of the dot pattern contained in the recorded image starting from the center of the image and progressing outwardly in a spiral fashion, and, when the dot pair contained in three contiguous L-shaped subareas has been found, computing the position of the center points of the further subareas adjacent thereto and limiting the search for the dot pairs contained in the respective subareas to an annular region extending around the computed center point.

13. The method according to claim 12, wherein the image is recorded by a dot-pattern reader, and the region of the printed medium from which an image is recorded by the dot-pattern reader is illuminated by a light source provided in the dot-pattern reader.

14. The method according to claim 13, wherein the wavelength or the wavelength range of the light emitted by the light source is selected in such a way that either in the region of the printed medium from which an image is recorded by the dot-pattern reader only the dots of the dot pattern to be scanned reflect the light emitted by the light source, or in the region of the printed medium from which an image is recorded by the dot-pattern reader only the dots of the dot pattern to be scanned do not reflect the light emitted by the light source.

15. The method according to claim 13 wherein the light source is selected from a group comprising an infrared light source, a light source radiating light having a wavelength in the range of 900 to 980 nm, a UV light source, and a light source radiating visible light.

16. The method according to claim 12 wherein the image is recorded by a dot-pattern reader, and the image of the region of the printed medium contained in the dot pattern is recorded by a camera provided in the dot-pattern reader.

17. The method according to claim 16, wherein the camera used is selected from a camera that is sensitive only to light reflected by the dots of the dot pattern, a camera that is sensitive only to light not reflected by the dots of the dot pattern, an infrared-sensitive camera, a camera that is sensitive to light having a wavelength in the range of 900 to 980 nm, a camera that is sensitive to UV light, a camera that is sensitive to visible light, and a camera that is sensitive to a given portion of visible light.

18. A method of reading stored data, the method comprising the steps of:

printing the data to be stored in the form of a dot pattern comprising a plurality of dots on the surface of a printable medium using a printer, the dot pattern including at least one dot pattern block covering a given area on the printable medium, an area covered by the at least one dot pattern block on the medium to be printed containing a plurality of subareas of equal size in rows and/or in columns and in each of which a respective dot pattern representing a portion of the data to be stored is printed, each subarea containing one of multiple different base dot patterns, each of the multiple base dot patterns being composed of two dots that with respect to a virtual reference point are point symmetrical within the respective subarea, the base dot patterns having at least one of the following characteristics:

they differ with respect to the angle of the virtual connecting line between the two dots of the respective base dot pattern relative to a virtual reference line, and/or they have a different spacing between the dots recording an image of at least a portion of the region of the printed medium containing the dot pattern, ascertaining the position of at least a portion of the dots contained therein from the image, using for each subarea of a dot pattern block, for determining the data an angle determination method and/or a length determination method, wherein in the angle determination method the angle of the virtual connecting line between the dot pair present in the respective subarea is ascertained with respect to a virtual reference line, or the angle of the virtual connecting line between the virtual center point of the respective subarea and one of the two points that must be contained in the respective subarea is ascertained with respect to the virtual reference line, and the data represented by the dot pattern contained in the affected subarea are determined as a function of the angular range within which the ascertained angle lies, the spacing between the dots of the dot pair is ascertained, the data representing the dot pattern contained in the affected subarea are determined as a function of the spacing range within which the ascertained spacing lies, treating a subarea containing a dot in its center as the subarea containing the reference dot pattern, treating the dot present in the center of the subarea as one of the dots of the reference dot pattern, and using the virtual connecting line between the other two dots of the reference dot pattern is as the reference line.

* * * * *